United States Patent [19]
Donley

[11] 3,978,272
[45] Aug. 31, 1976

[54] COATED ARTICLE FOR SOLAR CONTROL AND PROCESS FOR ITS PRODUCTION

[75] Inventor: Harold E. Donley, Oakmont, Pa.

[73] Assignee: PPG Industries, Inc., Pittsburgh, Pa.

[22] Filed: Mar. 13, 1974

[21] Appl. No.: 450,908

[52] U.S. Cl. .............................. 428/434; 126/270; 126/271; 350/1; 350/311; 427/165; 427/168; 427/226; 427/314; 427/404; 427/419; 428/469; 428/471; 428/472

[51] Int. Cl.² ..................... B05D 5/06; B32B 15/04; B32B 17/06; F24J 3/02

[58] Field of Search............. 117/33.3, 71 R, 124 S, 117/124 B, 124 C; 350/1, 311; 428/434, 469, 471, 472; 427/165, 168, 226, 314, 404, 419

[56] References Cited
UNITED STATES PATENTS

| | | | |
|---|---|---|---|
| 2,366,687 | 1/1945 | Osterberg | 350/164 |
| 2,676,117 | 4/1954 | Colbert | 117/124 C |
| 2,698,258 | 12/1954 | McGraw | 117/71 R |
| 3,087,831 | 4/1963 | Browne | 117/124 B |
| 3,410,710 | 11/1968 | Mochel | 117/124 B |
| 3,505,092 | 4/1970 | Ryan | 117/71 R |
| 3,528,845 | 9/1970 | Donley | 117/33.3 |
| 3,559,090 | 1/1971 | Referuet | 350/164 |
| 3,679,291 | 7/1972 | Apfel | 117/33.3 |
| 3,698,946 | 10/1972 | Kaspaul | 117/71 R |
| 3,846,152 | 11/1974 | Franz | 117/33.3 |

*Primary Examiner*—Ronald H. Smith
*Assistant Examiner*—William H. Schmidt
*Attorney, Agent, or Firm*—E. Kears Pollock; Donna L. Seidel

[57] ABSTRACT

Multiple layer films of silver-silver oxide and metal oxide are produced on transparent substrates for purposes of solar energy control and production of architectural colors. Solar control properties and the transmitted and reflected colors of the article can be altered by varying the thicknesses of the films and/or the selection of metal oxide overcoat.

The article produced can be used in a viewing closure and as a component in a solar energy collection system.

23 Claims, No Drawings

COATED ARTICLE FOR SOLAR CONTROL AND PROCESS FOR ITS PRODUCTION

BACKGROUND OF THE INVENTION

1. Field of the Invention

This invention relates to the pyrolytic production of a highly reflective solar control article by application of successive metal containing films to a glass substrate. In addition, these films provide a broad range of colors by reflection and transmission, optical uniformity and a durable surface coating.

2. Description of the Prior Art

Increasing use of flat glass as a structural material has emphasized the need to develop a means of controlling solar radiation while providing the color flexibility as required by architects. Solar control as a means of minimizing the cost of heating and cooling buildings is becoming increasingly critical due to energy and fuel shortages. Aesthetics dictate color flexibility.

Various methods have been attempted previously in an effort to develop these properties. Heat absorbing glasses wherein minor amounts of colorant oxides are added to the glass have been proposed. This method has not worked well for several reasons. Homogeneity and reproducibility are difficult and expensive to obtain. Heat absorbed by the glass is ultimately transferred to interior areas by reradiation, conduction, and/or convection. Thermal breakage, due to wide variations in temperature between the edges and the central portion of the glass panels, is encountered.

Attempts were made to produce a coated surface that would reflect the solar energy and thus limit the amount of absorption and the subsequent transmission to interior spaces. Deposition of films by electrolysis, vacuum sputtering, chemical reaction, and pyrolysis all suffered disadvantages. Electrolysis and vacuum sputtering are both difficult and relatively expensive. Sophisticated equipment is required and the size of glass that can be coated is limited by the physical size of the equipment. Except for small items such as optical lenses and the like, it is generally impractical and too expensive to produce such films. This is particularly true in connection with large glass sheets such as are used in producing vehicle or building closures.

Chemical deposition, like electrolysis and vacuum deposition, is also a comparatively expensive process requiring a number of time consuming and consequently expensive manipulations.

It had been generally difficult to obtain either adhesion or uniformity by pyrolytic methods of film application. However, the spray process offered by this method had the advantages of being very fast and extremely well adapted to high volume production where large square footages are encountered. Recent advances have been made in the pyrolytic application of metal and metal oxide films to yield adherent, uniform films.

Films of gold, platinum, and silver are known to yield high solar energy reflection. However, both the initial cost of materials and the cost of the best available method of deposition are prohibitive for large scale production of gold or platinum films. Pyrolytic methods have not been effective.

Silver is not quite as expensive and it has been successfully applied as a film by pyrolytic methods. In U.S. Pat. No. 3,528,845 Donley teaches a method to produce an optically uniform, adherent silver film that is both practical and economical. The silver film is pyrolytically deposited from a solution of a silver soap of an organic acid in an organic solvent with an amine being used as a solubilizing agent. The film produced exhibits excellent solar control properties.

Browne in U.S. Pat. No. 3,087,831 describes a pyrolytic method of applying a metal oxide film over a first layer of "loosely adhering silver powder". The silver powder imparts a hazy appearance rather than providing a high reflecting surface. This lack of optical uniformity tends to limit the solar control properties of the film. The metal oxide overcoat functions as a means of holding the silver powder in place as opposed to a discreet property enhancing film.

A superior method of producing a metal oxide film was described by Mochel in U.S. Pat. No. 3,410,710. A solution of metal diketonate in an organic solvent is sprayed on a hot substrate to form a uniform metal oxide film. Because of its uniformity, the film provides relatively good control of solar energy. The control capabilities can be increased by applying multiple layers of metal oxide with intermediate layers of amorphous silica. However, optical quality diminishes and visible transmission decreases as a function of increasing thickness. The cost of reheating and the time involved to apply multiple layers of film decreases the desirability of this method.

It has long been an objective to produce a high energy reflecting coating for the purpose of controlling solar energy transmission through glass. Most desirably, this film should also provide flexibility in color by reflection and transmission. It should be relatively economical and capable of high speed production runs. Dimensions of the glass should not be a limitation on the method of application.

SUMMARY OF THE INVENTION

The present invention describes a solar control article produced by coating a flat glass substrate with a silver containing film and then applying a second film of metal oxide over the silver containing film. The resultant article provides excellent control of solar energy:

| | | |
|---|---|---|
| a. | total solar energy reflectance | 45–65% |
| b. | infrared reflectance | 51–75% |
| c. | luminous reflectance | 11–68% |
| d. | Luminous transmittance | 9–31% |

Additionally, this dual coating provides a broad range of colors by reflection (gold to red) and transmission (blue to green).

More specifically, the films are deposited by spraying the hot (800°–1400°F.) glass substrate with a succession of coating solutions. First, a composition of about 0.2% to 28% by weight of silver that is present as a silver soap of an organic acid is solubilized in a solvent by the addition of a primary amine and sprayed on the glass. Immediately thereafter, the hot glass is sprayed with a solution consisting of a metal diketonate in a solvent. The result is a dual layer film composed of a first layer of silver-silver oxide and a second layer of metal oxide and having superior energy control properties.

BRIEF DESCRIPTION OF THE INVENTION

This invention makes practical the formation of transparent, optically uniform, multiple layers of metal and metal oxide film on a transparent glass substrate to provide a means of solar energy control. Pyrolytic deposition of a uniform, adherent silver containing film on a glass substrate followed immediately with an overcoat of durable metal oxide film yields an article with excellent solar control properties, durability, and a broad range of colors by reflection and transmission. Each of the properties can be readily controlled by varying the thicknesses and/or components of the films.

The process invention involves heating a glass substrate to a temperature of about 800°F. to 1400°F., preferably about 1100°F. This range of temperatures is relatively critical to the formation of uniform silver and metal oxide films. In particular, the silver film tends to crystallize below about 800°F. and to vaporize above about 1400°F. The metal oxide film loses uniformity and durability when applied at temperatures below about 800°F.

The heated substrate is then contacted with a composition consisting of (1) a relatively insoluble silver soap of an organic acid, (2) an amine having the structure

wherein $R_1$ and/or $R_2$ may be hydrogen or any organic moiety, and (3) an appropriate organic solvent or water for water soluble amines. The invention has particular utility with silver soaps of organic acids of less than about 10 carbon atoms, and the preferred silver soap is silver 2-ethyl hexanoate. This is the method described by Donley in U.S. Pat. No. 3,528,845 which description is incorporated herein by reference and made a part hereof.

An atomizing spray technique is preferable, but other methods of contact such as vapor deposition could also be employed. The resultant silver containing film is believed to be substantially metallic silver although small quantities of silver oxide may be present. Tests using an electron microscope showed closely spaced metallic silver "islands" of approximately $10^{-1}$ microns in diameter. Silver oxide particles would be approximately an order of magnitude larger. Significant amounts of silver oxide would decrease uniformity and greatly decrease the solar reflective capacity of the film. However, the film is optically uniform and exhibits excellent solar control properties.

Immediately following the application of the silver containing film, the coated surface of the hot glass is contacted with a composition consisting of a metal derivative of a 1,3-beta diketonate in an organic solvent. The most preferable metal diketonates are the metal acetyl acetonates because they form a much more uniform film. Furthermore, the acetyl acetonates of the metals used are mutually compatible, thus permitting mixtures to be applied for modified color effects. This process is described by Mochel in U.S. Pat. No. 3,410,710 which description is incorporated herein by reference and made a part hereof.

Varying solar control properties and colors can be attained by proper selection of the film thicknesses and the metal oxide overcoat. Metal oxides that were applied included iron, chromium, cobalt, nickel, tin, titanium, magnesium, aluminum, vanadium, manganese, copper, zinc, zirconium, bismuth, and cerium. These metal oxides were applied singly or in combination to determine their effect when deposited over the silver film. The specific results obtained in the examples of this specification are tabulated in Table 1.

Table 1 points out quite clearly (1) the effect of thickness of the films on the reflectance and transmittance characteristics displayed, (2) the effect of oxide selection on properties of the article, and (3) the changes in the ratio of reflected to transmitted light due to the different metal oxide overcoats.

The thickness of the silver containing film directly affects the amount of total solar energy reflected and transmitted as well as the luminous transmittance. As the thickness is increased the reflection increases and the transmission decreases accordingly. Metal oxide film thickness does not have as great an effect on reflection and transmission of total solar energy. Its major contribution would seem to be in the area of color flexibility. Thicker metal oxide films yield "deeper" colors, i.e., higher dominant wavelength. It is the metal oxide film which produces the color flexibility.

Various metal oxide films can be selected to provide specific desired results. Iron and cobalt oxide films are high reflecting in the near infrared wavelengths. Tin and titanium provide a more durable surface. Specific color requirements can be matched by selecting a particular metal oxide film.

The ratio of total solar energy reflected to that transmitted and to the luminous transmission varies according to the selection and thickness of metal oxide film. This results from the different absorptive and reflective characteristics of the metal oxides over the silver containing film. This would not be expected from analysis of the separate silver (Example 5) and metal oxide (Example 6) films. Proper selection of the metal oxide overcoat and its thickness provides flexibility in matching the solar control requirements of specific applications.

An additional consideration of any glass coating is durability. Titanium, chromium, and tin oxide display sufficient hardness that they can be used in single glazed applications. The others are somewhat less durable and would require an additional overcoat or be used in double glazed applications. Standard durability tests were run including accelerated salt spray (5% NaCl), acid resistance (5% HCl), and cyclic humidity (Water spray at 140°–160°F.). Durability of the coated article was directly related to the selection of metal oxide overcoat.

The metal oxide overcoat should be applied immediately following the application of the silver film. Minimizing the time lag between application of the two films is critical in order to obtain optical uniformity. The two compositions must be applied separately within seconds of each other. Greater time lags allow the glass to cool excessively and the temperature gradient across the glass sheet yields uneven film deposition and results in non-uniformity. While the films should be applied in a short time interval, it is equally critical that some time lag exists, i.e., the two compositions should not be codeposited. It is essential that two separate, distinct films are formed on the glass surface. Five percent by weight of the metal from the metal oxide forming solution added to the silver film forming solution yields a coating having approximately the same properties as the metal oxide film alone. Thus, solar control properties are greatly diminished and the unique color flexibility is eliminated.

After the films are applied, the article must be allowed to cool to a temperature of about 300°F. in about 15 to 20 minutes more preferably in about 10 minutes. If the article is held at or near the coating temperature or reheated for too long a time, the silver tends to migrate through the metal oxide overcoat giving a mottled appearance and a resultant loss of solar energy control due to the decreased uniformity of the silver film.

The present invention offers several advantages over the prior art:

1. It is a single step application. Previously, multiple steps had been required to attain equivalent solar control properties.

2. High speed application. Aside from the obvious savings of single versus multi-step application, these films can be applied to a high speed continuous operation.

3. No physical size limitation. The films can be applied to any size glass sheet using any of several available techniques.

4. Variety of reflected color. Prior to this invention great difficulty had been encountered in attempting to produce uniform gold or red reflecting films by pyrolytic techniques. Color by reflection and transmission can be altered by varying the thickness of the films and/or the selection of the metal oxide overcoat. Reflected colors can be varied from "light gold" through "red"; transmitted colors from "blue" through "green".

The colors described above can be defined more exactly by any one of several standard conventions. Using the conventional CIE System, color can be quantitatively expressed in terms of the following parameters: dominant wavelength, excitation purity, and Y-tristimulus or luminous reflection. The present invention exhibited the following values for reflected light based on the above criteria:

| dominant wavelength | 572 to 499c nanometers |
| excitation purity | 15% to 49% |
| luminous reflectance | 11% to 68% |

A dominant wavelength of 572 nanometers is a "light gold". The c following the 499 nanometer wavelength designates that it is a complementary wavelength. It is the complement to the color actually distinguished by the eye, in this case red. Other dominant wavelengths within this range can be produced by varying the thicknesses of the silver and metal oxide films and/or the selection of the metal oxide overcoat.

Excitation purity describes the quality of the color; i.e., how "pure" is it. The higher the percentage, the more vivid or pure the color. It is not uncommon for glass coatings to exhibit excitation purities for reflected light in the range of 1–10%. The high excitation purity of the reflected colors of this invention 15–49% attest to the high color quality of these films.

The solar energy control capabilities of the articles produced by the present invention are also exceptional. Characteristics of the films were measured using a Beckman DK-2A Spectrometer. "Total solar energy reflectance" is an integrated value for response over the spectral range from 300 to 2100 nanometers. The luminous reflectance and transmittance are integrated values for response over the spectral range from 380 to 760 nanometers. Reflectance is expressed as the percent of light reflected from the specimen tested compared with the light reflected from an uncalibrated aluminum mirror. Transmittance is expressed as the percent of light transmitted through the specimen relative to that transmitted through air. The articles produced by this invention displayed the following properties:

| Total solar energy reflectance | 45 to 65% |
| Infrared reflectance | 51 to 75% |
| Luminous reflectance | 11 to 68% |
| Luminous transmittance | 9 to 31% |

The thicknesses of the films effect the solar energy control properties and the reflected and transmitted colors of the article. The thickness of the silver containing film has the greatest effect on the solar properties; whereas, the thickness of the metal oxide film has a more direct effect on color. Thinner silver films tend to yield lower energy reflectance and thicker metal oxide films yield darker colors. The thickness of the silver film may range from 50 to 400 angstroms, and preferably from about 80 to 250 angstroms. The metal oxide film may vary from about 200 to 800 angstroms, and preferably in the range from 300 to 600 angstroms. Measurement of these thicknesses is performed by standard interferometric techniques using a Sloan M-100 Angstrometer.

In addition to its value as a viewing closure, the article of this invention is also suited to particular methods of solar energy collection. One such system being given consideration involves concentrating solar energy at the focal point of a large reflecting parabolic surface. In this manner, energy in the form of heat is collected at this one central point and utilized in any of several conversion techniques to produce electricity, steam, hot water, etc.

Color is of no consequence, nor is luminous transmittance. Therefore, the only concern is with the high reflecting character of the coatings. Thicker films are utilized in order to increase solar reflectance and approach the values produced by a mirror. The advantage of one-step, high speed production weighs heavily on initial cost considerations for such a system. The balance of initial cost versus the higher efficiency of a mirrored surface points toward the use of this article. Additionally, since we are not concerned with color or opacity, we can use more durable metal oxide overcoats to minimize maintenance costs and decreases in efficiency due to surface damage.

Practically any commercial glass may be utilized as a substrate for applying the present invention. For example, typical commercial glasses such as soda-lime-silicate glasses, lead-alkali-silicate glasses, boro-silicate glasses, boro-alumina-silicate glasses and the like may be utilized. These glasses may be clear, colored, photosensitive or heat-absorbing. In addition, other substrates may be used for solar collector applications as long as they are able to withstand the temperatures required for uniform coating.

The glass used in the examples is a typical soda-lime-silica glass having the following composition:

| Ingredient | Weight Percentage Range |
|---|---|
| SiO₂ | 60-75 |
| Na₂O | 5-17 |
| K₂O | 0-10 |
| K₂O + Na₂O | 10-17 |
| CaO | 5-15 |
| MgO | 0-7 |
| CaO + MgO | 0-15 |

The following examples illustrate specific embodiments of the instant invention. These examples are not to be construed as limiting the invention however, for the invention includes all the variations and modifications set forth hereinabove.

In each of the examples, clear glass sheets measuring 2 × 2 inches to 20 × 30 inches of various thicknesses were cleaned using standard procedures and heated to approximately 1100°F. in an electric furnace. The glass sheets were then removed from the furnace and immediately sprayed with the coating compositions described below. The sheets were sprayed using a hand held, atomizing spray gun held at a distance of about 10-12 inches from the glass surface. A back and forth motion was utilized in order to attain uniform coverage. Multiple or rotating sprays could also be used for larger glass sheets.

In order to measure the effects of the spray, thermocouples were attached to the glass surface. Surface temperature of the glass from the furnace was maintained at approximately 1100°F. Spray solutions were held at room temperature, about 70° to 80°F. Upon spraying, the glass surface temperature rapidly dropped approximately 300°F to about 800°F. It then underwent an almost immediate recovery to approximate 1050°F. The second spray solution was then applied to the glass surface and the article was allowed to cool.

The results of each of the following examples is tabulated in Table 1.

EXAMPLE I

A silver film forming solution was prepared by mixing 10 grams of silver 2-ethyl hexanoate, 40 grams of toluene, and 5 milliliters of normal hexyl amine. The resultant solution contains approximately 7.5% metallic silver. This solution was then sprayed on the 1100°F. glass surface for a period of about 10 seconds. An optically uniform silver containing film was formed on the glass.

Immediately following this application, an iron oxide film-forming solution which had been previously prepared was sprayed over the silver film using a separate spray gun. This solution had been prepared by mixing 20 grams of ferric acetylacetonate with 43cc of methanol and 127cc of toluene to form a 2% metallic iron solution. This solution was sprayed for approximately 5-6 seconds to form an iron oxide overcoat on the silver containing film. The article was gold by reflection and blue by transmission.

EXAMPLE II

Solutions were prepared in exactly the same manner as in Example I, but were employed in such a manner as to produce a thinner metallic silver-silver oxide film and a slightly thicker iron oxide film. This difference in thickness is obtained by limiting the spray time to approximately 2-3 seconds; thus limiting the amount of silver film-forming solution to approximately one-fifth the volume sprayed in Example I. The iron oxide film-forming solution actually sprayed is increased only about 10 percent; i.e., 6 to 7 seconds. The iron oxide forms at a more rapid rate because of the higher glass surface temperature. The article was red by reflection and green by transmission.

EXAMPLE III

The silver film-forming solution was prepared and sprayed in the same manner recited in Example I. The resultant film was then coated with a chromium oxide

TABLE I

| Example | Film Thickness (Angstroms) | | | Color | Reflectance Dominant Wavelength (mmu) | % TSER | Color | Transmittance Dominant Wavelength (mmu) | TSET | LT |
|---|---|---|---|---|---|---|---|---|---|---|
| | 1st | 2nd | 3rd | | | | | | | |
| 1. Ag-Fe | 150 | 500 | — | Gold | 579.4 | 65 | Blue | 479.9 | 12.8 | 13.0 |
| 2. Ag-Fe | 80 | 600 | — | Red | 499.4c | 45 | Green | 505.0 | 19.7 | 30.7 |
| 3. Ag-Cr | 120 | 475 | — | Yellow-Gold | 575.6 | 57 | Blue | 475.1 | 25.1 | 13.2 |
| 4. Ag-Cr | 80 | 500 | — | Orange-Red | 500.3c | 37 | Blue-Green | 484.1 | 33.0 | 25.0 |
| 5. Ag | 250 | — | — | Silver | 572.7 | 60 | Violet-Blue | 448.0 | 23.9 | 6.7 |
| 6. Fe | 500 | — | — | Neutral | — | 23.1 | Light Brown | — | 53.2 | 52.2 |
| 7. Ag-Sn | 150 | 500 | — | Gold | 578.0 | 58.0 | Blue | 475.6 | 30.0 | 15.0 |
| 8. Ag-Co | 150 | 500 | — | Gold | 577.5 | 61.0 | Blue | 476.0 | 14.1 | 13.6 |
| 9. Co-Ag | 550 | 125 | — | Silver | — | 47.0 | Light Brown | — | 16.0 | 18.0 |
| 10. Ag-Ni | 150 | 500 | — | Gold | 575.5 | 54.0 | Blue | 478.0 | 26.5 | 13.7 |
| 11. Ag-Ti | 150 | 500 | — | Gold | 576.0 | 56.0 | Blue | 476.6 | 25.8 | 13.4 |
| 12. Ag-Co/Fe/Cr | 150 | 500 | — | Gold | 577.2 | 50.0 | Blue | 475.3 | 16.0 | 15.0 |
| 13. Fe-Ag-Fe | 350 | 150 | 300 | Gold | — | 54.0 | Light Brown | — | 15.0 | 13.5 |
| 14. Ag/Cr | 225 | — | — | Silver | — | 13.0 | Fuscia | — | 58.0 | 57.0 |
| 15. Ag/Cr | 200 | — | — | Silver | — | 23.0 | Fuscia | — | 37.0 | 21.0 |
| 16. Ag/Cr | 150 | — | — | Silver | — | 28.0 | Blue | — | 35.0 | 18.6 |

TSER = Total Solar Energy Reflectance
TSET = Total Solar Energy Transmittance
LT = Luminous Transmittance
— = Indicates Discreet Films
/ = Indicates Multi-Component Film film developed by substituting 20 grams of chromium acetylacetonate for the 20 grams of ferric acetylacetonate in Example I.

The article was yellow-gold by reflection and blue by transmission.

EXAMPLE IV

In this and all following examples, the silver film-forming solution, (silver solution), is exactly the same as in Example I and is sprayed for approximately 10 seconds unless otherwise noted. The metal oxide film-forming solutions, (metal oxide solution), will all be approximately 2% metal as in Example I. In each case, 20 grams of the metal acetylacetonate will be substituted for the ferric acetylacetonate. Solutions will be sprayed for approximately 5–6 seconds unless noted.

A thin silver film was produced by limiting the spray time on the silver solution to approximately 2–3 seconds and then coated with chromium oxide.

The article was orange-red by reflection and blue-green by transmission.

EXAMPLE V

The silver solution was sprayed for about 16 to 18 seconds in order to form a very thick, almost opaque, silver film. This film was not coated. The purpose of this example is to point out the advantages of the silver film plus metal oxide overcoat. Total solar energy transmitted and reflected and luminous transmittance are all significantly better for the combination of films. They keep out more heat while allowing more light to come in. The dual layer films also provide color flexibility which is not available with only the silver film.

The article was silver reflecting and violet-blue by transmission.

EXAMPLE VI

The metal oxide solution was sprayed on the 1100°F. glass surface for about 5 seconds to form an iron oxide film. No silver film was applied. This example is the metal oxide alone and helps point out the unexpected results attained with the silver film coated with a metal oxide film. Both color and solar properties attained using the present invention are novel.

The article was neutral reflecting and light brown by transmission.

EXAMPLE VII

Tin is used in the metal oxide solution and sprayed over a silver film.

The article was gold reflecting and blue by transmission.

EXAMPLE VIII

Cobalt is used in the metal oxide solution and sprayed over a silver film.

The article was gold by reflection and blue by transmission.

EXAMPLE IX

Cobalt was again used in the metal oxide solution, but this time the metal oxide film was applied to the glass first. The cobalt oxide film was then coated with the silver film. Solar energy reflected was decreased from that obtained by the reverse application used in Example XIII. Transmission was conversely increased.

The article was silver reflecting and light brown by transmission.

EXAMPLE X

Nickel is used in the metal oxide solution and sprayed over a silver film.

The article was gold reflecting and blue by transmission.

EXAMPLE XI

Titanium is used in the metal oxide solution and sprayed over a silver film.

The article was gold reflecting and blue by transmission.

EXAMPLE XII

A mixture of 30% cobalt (6 grams), 30% iron (6 grams), and 40% chromium acetylacetonate (8 grams) is used in the metal oxide solution and sprayed over a silver film. The films were both uniform. The combination of metal oxides could be selected to provide particular solar properties or architectural colors. The ability to use combinations of the various metals provides greater flexibility as to desired properties.

The article was gold reflecting and blue by transmission.

EXAMPLE XIII

The same solutions as were utilized in Example I were sprayed in the following order: iron oxide film, silver film, and a third film of iron oxide. There is no real advantage to this three layer system and, in fact, solar energy reflectance is down significantly and transmission is increased slightly. The opposite result is desired.

The article was gold reflecting and light brown by transmission.

EXAMPLE XIV

The next three examples point up the necessity of applying two separate and distinct films in lieu of co-deposition. In each example, a percentage of chromium acetylacetonate was added to the silver film-forming solution which was then sprayed onto the 1100°F. glass. The rate of deposition was slightly higher with increased chromium concentration. The films effectively lost any value of the silver film and acted like the metal oxide film with only a 5% by weight concentration of chromium. As little as 1% had a very detrimental effect on solar control capabilities.

The silver film-forming solution was prepared as in Example I except that 0.5 grams of chromium acetylacetonate were added to the solution to yield a solution with approximately 5% chromium by weight.

The article displayed properties similar to a single chromium oxide film with no silver present.

EXAMPLE XV

Chromium acetylacetonate (0.3 gram) was added to the silver film-forming solution of Example I. The solution was approximately 3% chromium by weight.

The film exhibited somewhat better results than the 5% solution of Example XIV but still not equivalent to a dual film.

EXAMPLE XVI

Chromium acetylacetonate (0.1 gram) was added to the silver film-forming solution of Example I. The solution was approximately 1% chromium by weight.

The film capabilities were similar though not as good as a separate silver film coated with chromium oxide. One percent chromium decreased the solar energy reflection by almost 50% as compared with a 100% silver film.

The above examples are illustrative of specific embodiments of the present invention. It is not intended that the scope of the invention shall be limited by these embodiments except insofar as is set forth in the accompanying claims.

I claim:

1. A process for forming a coated glass article comprising the steps:
   1. contacting a heated glass substrate at a temperature of at least about 800°F. with a solution or suspension of a silver compound which thermally decomposes to form metallic silver film upon contact with the heated substrate, thereby forming a glass article having a pyrolytically deposited metallic silver film upon said glass substrate,
   2. contacting the metallic silver coated substrate at a temperature of at least about 800°F. with a solution or suspension of a metal compound which thermally decomposes to form a metal oxide film upon contact with the substrate, thereby producing a coated glass article having a first film of pyrolytically deposited metallic silver and a second film of pyrolytically deposited metal oxide upon said first film.

2. A process according to claim 1 wherein steps 1 and 2 are accomplished by heating the glass substrate to a temperature between about 800°F. and 1400°F., and are conducted in rapid sequence and where the resultant coated glass substrate is subsequently cooled to about 300°F. within about 20 minutes after the films are applied.

3. A process according to claim 2 wherein the successive films are deposited on a glass substrate by contacting a surface of the heated substrate in sequence with coating compositions comprising:
   1. first, a silver coating composition comprising:
      a. about 0.2 to about 28 percent by weight of silver present as a silver soap of an organic acid having about 2 to 10 carbon atoms;
      b. an amine having the structure:

wherein $R_1$ and $R_2$ are selected from the class consisting of hydrogen and organic moieties containing less than about 10 carbon atoms; and
      c. a solvent wherein the quantity of said amine is sufficient to solubilize said silver soap in said solvent, and
   2. second, a metal oxide coating composition comprising:
      a. a metal diketonate, and
      b. a solvent.

4. A process according to claim 3 wherein the glass substrate is a clear transparent glass substrate and both the silver film and the metal oxide film are transparent.

5. A process according to claim 4 wherein the silver soap is silver 2-ethyl hexanoate and the metal diketonate is a metal acetyl acetonate.

6. A process according to claim 5 wherein the metal acetyl acetonate is a derivative of a metal selected from the class consisting of iron, chromium, cobalt, nickel, tin, titanium, magnesium, aluminum, vanadium, manganese, copper, zinc, zirconium, bismuth, cerium, and mixtures thereof.

7. An article of manufacture produced according to the process of claim 4, which article can be silver-gold through red appearing by reflection and blue to green appearing by transmission, the thicknesses of the silver and metal oxide films being such that the article has the following solar and specular properties:

| | | |
|---|---|---|
| a. | total solar energy reflectance | 45–65% |
| b. | infrared reflectance | 51–75% |
| c. | luminous reflectance | 11–68% |
| d. | luminous transmittance | 9–31% |
| e. | dominant wavelength of reflected light | 572–499.4c nm |
| f. | excitation purity of reflected light. | 15–49% |

8. The article of claim 7 wherein the metal oxide coating is iron oxide.

9. The article of claim 7 wherein the metal oxide coating is chromium oxide.

10. The article of claim 7 wherein the metal oxide coating is cobalt oxide.

11. The article of claim 7 wherein the metal oxide coating is nickel oxide.

12. The article of claim 7 wherein the metal oxide coating is tin oxide.

13. The article of claim 7 wherein the metal oxide coating is titanium oxide.

14. The article of claim 7 wherein the metal oxide coating is magnesium oxide.

15. The article of claim 7 wherein the metal oxide coating is aluminum oxide.

16. The article of claim 7 wherein the metal oxide coating is vanadium oxide.

17. The article of claim 7 wherein the metal oxide coating is manganese oxide.

18. The article of claim 7 wherein the metal oxide coating is copper oxide.

19. The article of claim 7 wherein the metal oxide coating is zinc oxide.

20. The article of claim 7 wherein the metal oxide coating is zirconium oxide.

21. The article of claim 7 wherein the metal oxide coating is bismuth oxide.

22. The article of claim 7 wherein the metal oxide coating is cerium oxide.

23. The article of claim 7 wherein the silver containing film is 50 to 400 angstroms thick and the metal oxide coating is from 200 to 800 angstroms.

* * * * *